Dec. 24, 1957   J. M. BARNÓTHY   2,817,771
PULSE-HEIGHT DISCRIMINATOR
Filed April 6, 1953   2 Sheets-Sheet 1

INVENTOR
Jeno M. Barnothy

BY Harold T. Stowell
ATTORNEY

Dec. 24, 1957  J. M. BARNÓTHY  2,817,771
PULSE-HEIGHT DISCRIMINATOR
Filed April 6, 1953  2 Sheets-Sheet 2
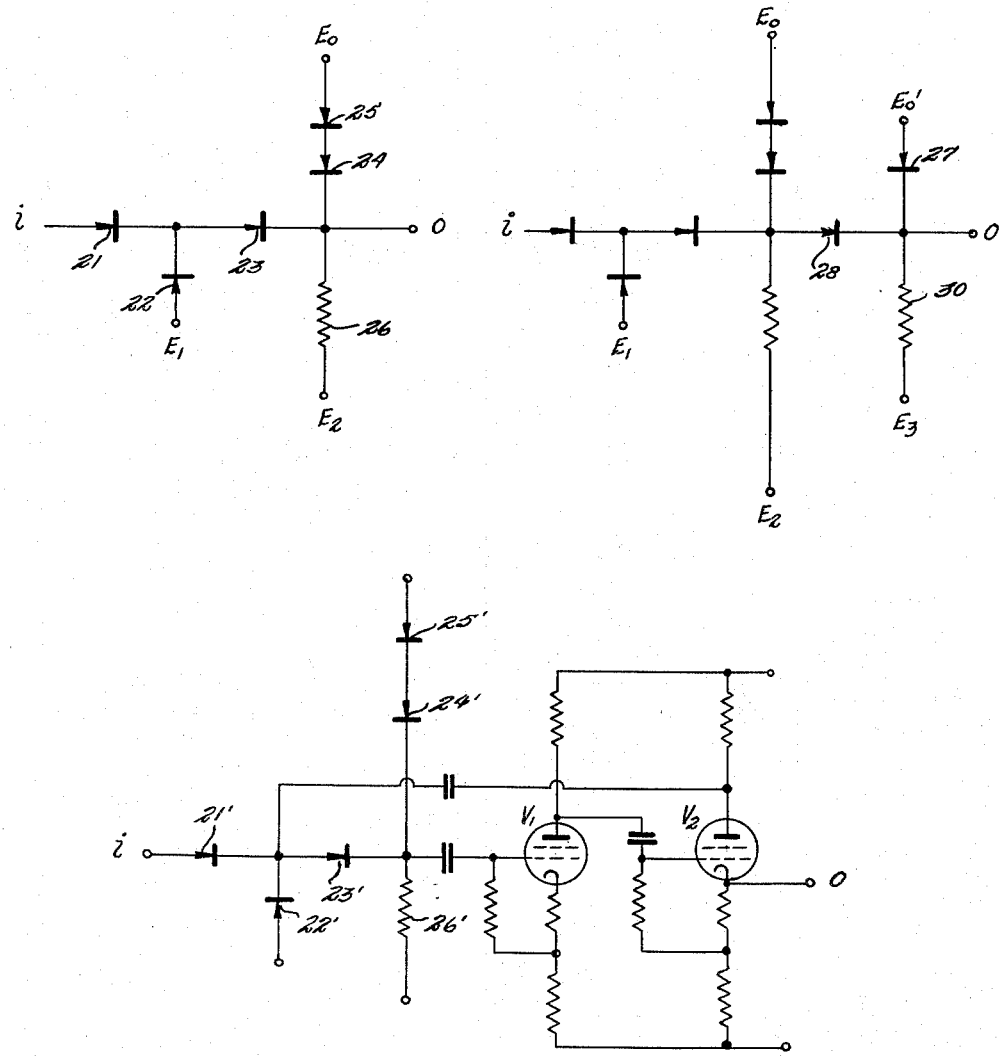

2,817,771
PULSE-HEIGHT DISCRIMINATOR

Jeno M. Barnóthy, Evanston, Ill., assignor to Research Corporation, New York, N. Y., a corporation of New York Application April 6, 1953, Serial No. 346,979

14 Claims. (Cl. 307—88.5)

This invention relates to electrical systems for the accurate discrimination of voltage amplitudes, and particularly of pulse-height amplitudes. It has particular relation to electrical translation systems of the class which may be termed amplitude channelizers, that is, apparatus which has for its function the classification of signals in accordance with the amplitude ranges within which said signals lie, and particularly for producing output indications on a channel specially reserved for signals having an amplitude lying within a given range.

One important application of the invention is as a discriminator for use with a scintillation spectroscope, although the invention obviously also has utility for the statistical determination of the distribution of any series of events which can be translated into corresponding electric pulses whose amplitude is a significant function of the respective events.

Scintillation spectroscopes are gaining increasing importance in nuclear physics research. They are not only unique in gamma ray spectroscopy but due to the latest improvements in scintillation phosphors, photomultipliers, amplifiers and pulse analyzers they now compare favorably with magnetic spectrometers. Multi-channel analyzers which have enough channels to cover the full spectrum are unequalled whenever a quick determination of the spectrum is necessary.

The usefulness of any spectrometer obviously depends on its resolving power and the exactitude and stability of the scale on which the spectrum is displayed. Unfortunately these quantities are here not, as in the case of optical spectrometers, defined through the grating and the optical system once for all, but in the scintillation spectrometer each line of the scale, i. e., each channel edge has to be set separately and its position changes with time and use and the exchange of parts; it has to be set and calibrated again and again. Due to this circumstance the resolving power and exactitude of a scintillation spectrometer is not only determined by its design, but it is to a far greater extent a function of the maintenance. Any simplification in the maintenance is equivalent to an increase in the resolving power and in the exactitude.

The maintenance itself can be subdivided into three main parts:

(1) The calibration required after the first assembly of the instrument from ready made parts; such calibration being necessary even if these parts had been previously tested, selected or matched according to their specifications.

(2) Calibration at later dates because with time and use certain parts change their performance.

(3) Calibration necessary because parts with finite lifetime have to be replaced and the replacement even with preselected parts involves significant errors.

The first of these has bearing on the production cost of the instrument, whereas the second and third weigh heavily on the experimentalist using it. Therefore, we may expect of an ideal solution that besides having an adequate resolving power, it should not contain any parts which have significant fluctuations or drifts, or which cannot be exchanged without causing errors.

Scintillation spectrometers consist, as known, of the phosphor, the photomultiplier, the amplifier with pulse-shaping device, the pulse-amplitude discriminator and the recording device. Of these five parts, the greatest limitation with regard to accuracy, in the present stage of development of the commercially available components is found in the pulse amplitude discriminator.

An example of a typical circuit currently used will be found in Review of Scientific Instruments, vol. 18, No. 2, February 1947, pp. 90–100, entitled "A pulse analyzer for nuclear research." Another example is found in the Proceedings of IRE, May 1949, vol. 37, pp. 564–567. Both of these arrangements rely on the use of a linear amplifier. However, a good linear amplifier cannot deliver pulses exceeding 100 v. and with 100 channels their width cannot exceed 1 volt. An exactitude of at least 5 percent is required in the channels with the lowest intensities and about 1 percent in the channels near to the intensity peak. The error in the low intensity channels will be mainly due to the statistical fluctuation in the number of counts recorded in each channel; whereas in the high intensity channels the variation in the levels of the discriminators and the error in the setting of the channel-edges above the base line will be the dominant factors. One cannot expect, without unduly increasing the price of the instrument, to use precision resistors with less than 0.5 percent tolerance in the resistance chain or in the potentiometers supplying the bias voltages, yielding an error of ±0.5 percent in the channel-width. Therefore, in order to have in the channel-width a total error of less than 1 percent, the permissible uncertainty in the levels of the discriminator must be less than 0.6 percent, i. e. 6 mv.

Should the measurement of the spectrum be completed within one hour and an exactitude of 5 percent maintained in the lowest intensity channels, the total counting-rate must be at least 4000 per second, it being assumed that the proportion of the intensities in the different channels does not exceed 1:1000. Sometimes it is not possible to shape adequately the pulses arriving on the input of the discriminator. For instance, if the pulse is only RC shaped with a time constant of 1 $\mu$sec.; the peak of the pulse will exceed the 99 volt discrimination level only for a time of 0.028 $\mu$sec., hence the discriminator will be able to respond properly only if it operates very rapidly, i. e., with an overall rise-time less than 0.01 $\mu$sec.

Summing up: the following properties are to be expected from an ideal discriminator:

(1) It should be possible to set the distance of the channel-edges from the base line with an exactitude of 5 mv., using only ready-made parts and no further calibration should be necessary.

(2) The channel-edges should be constant within 3 mv. against short term and long-term drifts.

(3) The rise-time of the discriminator should not exceed 0.01 $\mu$sec. and the fall-time be not more than 1 $\mu$sec.

These requirements are not met by any presently available apparatus, and in fact the present discriminators fall far below the requirements stated above. Actually this is not very astonishing if one takes into account that all these discriminators use thermionic emission and one cannot expect a device which has 100 mv. long-term drift, ±30 mv. jumps and individual differences of 1.5 volts in the contact potentials to reach an exactitude of 6 mv. even by using the most ingeniously constructed circuits.

The limited performance of thermionic discriminators can be explained by the following facts:

(1) With thermionic emission the number of electrons emitted from the cathode is a function of the cathode surface. Since the latter is heated to incandescence, its surface will change, leading thus to short-term and long-term drifts and sudden jumps.

(2) The break in the volt-ampere characteristic is not sharp enough to procure good discrimination. For instance, if the discrimination takes place at 0.4 amp., the potential difference necessary to decrease the current to a negligible amount (say, 1 percent of the original) will be 4.2 volt.

(3) The break in the volt-ampere characteristic is not located at zero voltage, but at a negative voltage of several volts, which is, furthermore, temperature dependent.

A device which has none of the above mentioned deficiencies is the crystal diode. Their use as discriminators in pulse-amplitude analyzers was already suggested by Parson in the IRE publication noted above; nevertheless they do not appear to have heretofore found practical application. The reason for this omission is that crystal diodes are reported to have also some serious disadvantages of quite a different nature:

(1) The back resistance of a crystal diode is not infinite and furthermore it is highly temperature dependent. A discriminator which has to deal in the higher channels with pulses up to 100 volts is constantly exposed to reverse voltages of the order of 100 volts. The temperature dependance of the reverse current flowing through the load resistor will involve serious changes in the discrimination levels.

(2) The forward characteristic of a crystal diode is also subject to changes with temperature; displacements of the order of 50 mv. will result from 20° C. ambient change.

(3) Crystal diodes, like all other rectifiers, possess capacitances which shunt the elements when in their nonconductive state, thus transmitting a fraction of the signal dependent on its wave front rate. Although the capacitance of germanium diodes is very small, about 0.8 $\mu\mu f.$, it is a function of the reverse voltage stress and therefore the usual method of compensating the capacitance by means of paraphased pulses supplied by the main amplifier is not applicable here.

I have made measurements on 1N56 high conduction diodes; 1N58 100 volt diodes and 1N54 high back resistance diodes. These measurements did not confirm the high temperature dependance either of the back resistance or of the contact potentials. However, I found such great differences and inconstancies in the back currents of the 1N58 diodes at high reverse voltages that only as much can be stated that after discarding 50 percent of the diodes the reverse current is less than 0.2 ma. at 100 volt reverse voltage and will remain below this value at ambient temperature under 30° C. The reverse current of 150 volts and 200 volt diodes is smaller by a factor of 2.5 and 4 respectively.

Out of ten units each of 1N56 and 1N58 diodes, three pairs of each could be selected by means of their forward contact potentials at 100 microampere in such a manner that the contact potential differences between pairs were less than 1.3 mv. Furthermore, it was possible to form out of the so selected pairs three groups of four diodes (two matched 1N56 and two matched 1N58) in a manner that the difference of the forward temperature coefficients between the pairs within the group was less than 0.08 mv./° C.

Simple mathematical reasoning indicates that out of N diodes Δ N diodes have to be discarded because they cannot be matched within a given limit S in the contact potentials (or in the temperature coefficients or whatever is taken as the basis of the matching) into pairs, if S is their standard deviation from the mean. The relative number of discarded diodes is:

$$\frac{\Delta N}{N} = \frac{2.82 s/S}{In(NS/s) - 1.61}$$

if $S \ll s$.

Using this equation we find that with the given standard deviations in the contact potentials and the given standard deviations in the temperature coefficients only 4 dard deviations in the temperature coefficients only 4 units out of 1000 units of 1N56 and 10 units out of 1000 units of 1N58 diodes cannot be arranged in pairs with contact potential differences less than 2 mv. All matched pairs can be sorted into groups of four with temperature coefficients of the contact potentials deviating with less than 0.10 mv./° C.

It is a primary object of applicant's invention to eliminate the aforementioned deficiencies which have so far hindered the application of crystal diodes to pulse amplitude analysis, in spite of the great potential advantages of such diodes.

Specifically, it is an object of the invention to provide a discriminator unit for use with amplitude channelizers which may be transferred from one channel to another without requiring recalibration.

It is also an object to provide a discriminator unit which can be assembled out of ready made parts without requiring calibration for separate channel settings, so as to enable mass production of such units.

It is another object to provide a discriminator unit which may be transferred between the highest and lowest channel of an amplitude channelizer without requiring alteration or calibration.

Another object is to provide a discriminator unit of great sensitivity which uses only low cost components.

According to the invention, a back-biased diode crystal arrangement is used as a discriminating device, employing main and auxiliary discriminator diodes, the main discriminator diode being relieved of back-voltage by an auxiliary diode arrangement, whereby the factors which normally tend to cause instability in the diode are largely eliminated. In addition, the diodes are temperature-matched in a novel manner to provide automatic temperature compensation and operation independent of temperature changes.

The specific nature of the invention, as well as other objects and advantages thereof, will clearly appear from a description of a preferred embodiment as shown in the accompanying drawing in which:

Fig. 2 is a schematic detail circuit drawing of one form of discriminator using diodes suitable for use in the analyzer of Fig. 1;

Fig. 3 is a circuit diagram of a modified discriminator arrangement suitable for the production of smaller output pulses; and Fig. 4 is a diagram of a circuit in which the pulse amplitude discriminator is simultaneously used as trigger discriminator.

Figure 1:
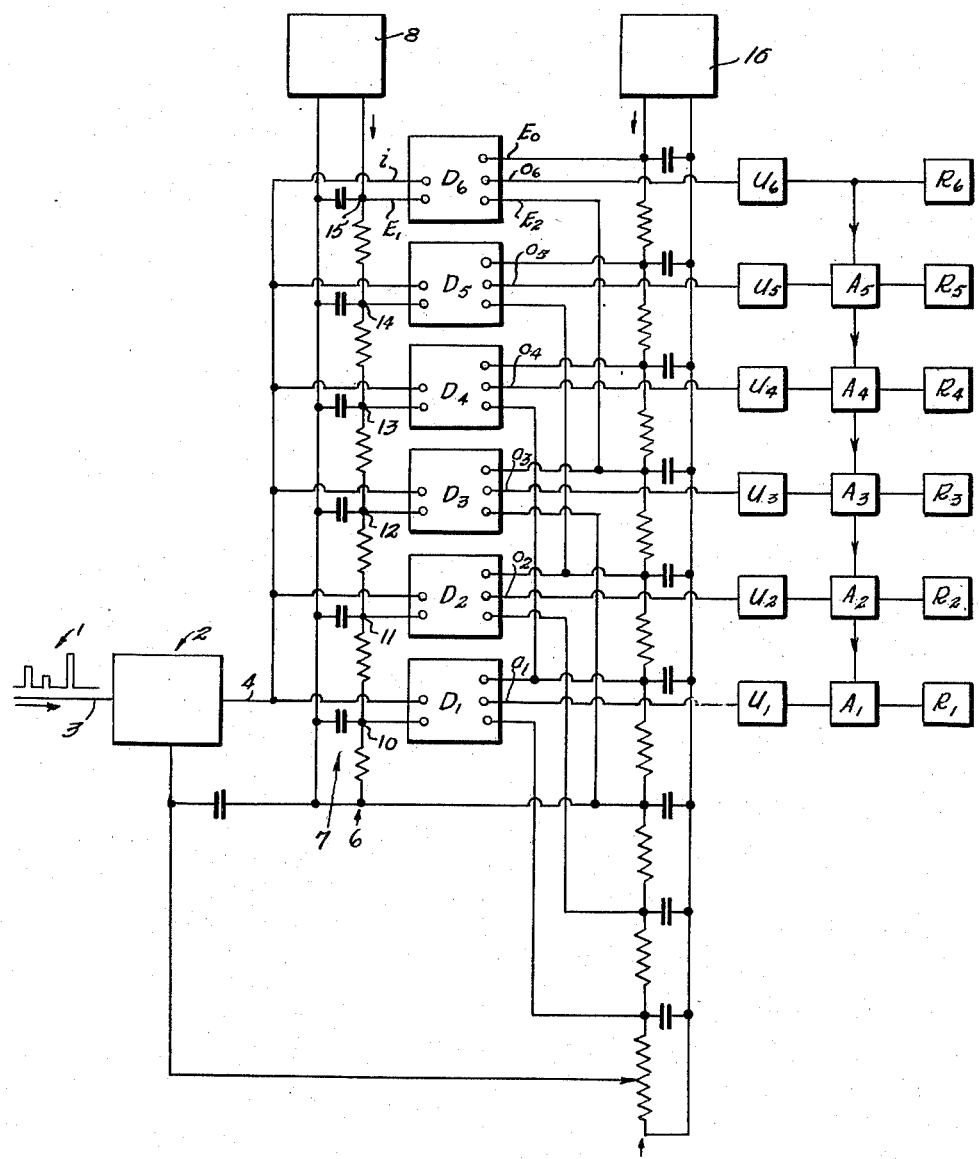
Fig. 1 is a schematic circuit diagram of a six-channel pulse amplitude analyzer utilizing the novel pulse discriminator according to the invention.

Referring to Fig. 1, the pulses schematically indicated at 1, are passed over line 3 to driver 2. The pulses have been adequately amplified, and spaced by well known means which are no part of the present invention. Driver 2 has a sufficiently low internal resistance so that the pulse height and shape are not appreciably altered due to the changing input-load of the discriminators in action. Since the capacitive load of the discriminators is very small, a driver comprising a cathode-follower with considerable negative feedback will serve the purpose. For use with a six-channel discriminator as shown in Fig. 1, a great deal of driving power is not required; however, in the case where an analyzer is provided with channels up to perhaps 100, a parallel connection of cathode-followers and stacked-up followers can be used, it being obvious in any case that the power capacity of the driver should be adequate for the load contemplated. The output of the driver is fed through lead 4 into six discriminators $D_1$ to $D_6$, the details of each discriminator being shown in Fig. 2. Each discriminator must be supplied with three regulated voltages $E_1$, $E_0$, and $E_2$. The voltages $E_1$ are supplied by a resistance-chain 6 serving as a voltage divider and fed with constant current from any suitable current regulator 3. The difference in potential between the respective voltages $E_1$ supplied to adjacent discriminators are equal to the desired channel width, which may be in the order of, for example, one volt. The junction points 10 to 15 inclusive of the resistance chain are grounded through respective by-pass capacitances 7 to the common return lead of the current regulator 8. A similar voltage divider arrangement 16 is utilized to supply the voltages $E_0$ and $E_2$ to the respective discriminators. The respective $E_0$ voltages of adjacent discriminators are again separated by the desired channel-width, and the same is true of the respective voltages $E_2$. However, the voltage $E_2$ for any given discriminator is, as will be apparent from the diagram, lower than its corresponding voltage $E_0$ in order to provide the necessary voltage drop as will be apparent from the detailed description of the discriminator.

The respective output pulses 0-1 to 0-6, respectively, are fed to univibrators $U_1$ to $U_6$. In order to decrease the capacitive load of the driver, a cathode follower input of the univibrator is preferable. The univibrators are followed by anticoincidence circuits associated with discriminators $D_2$ to $D_6$, inclusive. The terminal equipment for each stage is a recorder $R_1$ to $R_6$. The anti-coincidence units $A_2$ to $A_6$ are provided so that each recorder will respond only to the pulses in its associated channel, and not to all of the other pulses of lower voltage. This is necessary because each discriminator unit passes all pulses greater than its discrimination level; therefore, the lowest voltage channel will pass all pulses to which the system will respond, and the next lowest channel will pass all pulses except those peculiar to the lowest channel, etc. This result would, of course, still be useful, as it would only be necessary to compute the differences in readings of the successive recorders. However, this may be avoided by the use of the anti-coincidence circuit, which is a well known type of arrangement whereby each energized channel biases off each preceding channel so that only the highest energized channel which is energized by any pulse will record that pulse. Such an arrangement is shown in the Proceedings of IRE article previously referred to, on page 565, Fig. 3.

Referring now to Fig. 2, the discriminator shown therein consists of two diodes, 23 and 25, which may be either of the high-conduction or of the high-back resistance type, three high-back voltage diodes 21, 22, and 24, and a resistor 26 which should be large compared with the forward resistance of the diodes 24 and 25; i. e. of the order of 100,000 ohms. The back resistance of diode 21 should be such as to limit the reverse current to 200 microamperes even at the highest reverse voltages to which it may be subjected. The diodes 21 and 24 and similarly diodes 23 and 25 are matched within two millivolts at a forward current in the order of 100 microamperes. The respective matched pairs 21 and 24 and also 23 and 25 should be matched within 0.1 millivolt per ° C. with respect to their temperature coefficients in the forward direction.

The discriminators in the different channels of Fig. 1 obtain their bias voltages from the common resistance chains 6 and 16. Resistor 16 should be a chain of precision wire-wound resistors having 0.5 percent tolerance and negligible temperature coefficient and should be fed by a carefully designed current regulator 10 with highly constant current. Resistance chain 6 need not be of as great precision as chain 16, as will be apparent when its function is described in detail. In each discriminator, the voltage $E_0$ is sufficiently higher than the voltage $E_2$ so that in the quiescent state the current in the order of 100 microamperes will flow in the forward direction through the diodes 25 and 24 and the load resistance 26. The design of the voltage divider 16 should be such that the current flowing through the resistance chain is larger by a factor of 1,000 than the current flowing between $E_0$ and $E_2$, or in other words, about 100 milliamperes. In the quiescent or unactivated condition, the potential of the output O at each stage is lower than $E_0$, the difference being equal to the contact potentials of forward resistances of diodes 24 and 25, that is, at 100 microamperes it is about 300 millivolts. In this quiescent stage, the potential $E_1$ should be approximately 0.1–0.2 volts below that of O, or in other words, approximately 0.4–0.5 volts less than $E_0$. It will be understood, of course, that the precision of the elements following the discriminator must be sufficiently great so that they will not affect the accuracy of the discriminator. A carefully coupled univibrator with 50 millivolts uncertainty in its sensitivity and preceded by an amplifier having a gain of 20 with two percent gain stability will satisfy the purpose. The trigger level should be set equal to the potential difference between $E_0$ and O and in the quiescent state, that is, approximately 0.2–0.3 volts.

The manner in which the error due to the reverse current is eliminated by this arrangement will now be described. The main discriminating diode 23 is preceded by an auxiliary arrangement consisting of diodes 21 and 22. It should be emphasized that 21 and 23 are not simply connected in series, as has been shown in the prior art, but that 21 is a separate auxiliary discriminator with its own load resistance (supplied by the diode 22); therefore 21 takes over 99 percent of the reverse voltage and that its back current of a maximum of 200 microamperes flows through the low forward resistance of 22. Accordingly, the reverse voltage remaining on the main discriminator diode 23 will never, even in the highest channel, be more than 0.7 volt and the reverse current not more than 5 microamperes. Furthermore, in order to eliminate changes in the potential in the quiescent level of O, such as might be due to temperature or other differences in the intensity of the reverse current flowing through the load resistor 26, the potential of O is stabilized by means of the low forward resistances of diodes 24 and 25.

The changes which might occur in the reverse current flowing through 23 include the following:

(1) $\pm 1$ microampere for a temperature difference of $\pm 5°$ C.;

(2) 2.3 microamperes decrease if the discriminator is transferred from the highest to the lowest channel; and (3) 2.4 microamperes in case a replacement of the diodes is necessary, due to unavoidable differences between diodes.

Altogether, the greatest difference occurring in the reverse current of diodes 23 due to all of these factors would be 5 microamperes, and this is to be compensated by an equal difference in the forward currents of diodes 24 and 25. These forward currents being in the quiescent state 100 microamperes, 5 microamperes change would therefore involve, at the most, a change of 1.5 millivolts in the quiescent level. This is so because the volt-ampere characteristic of the forward current is approximately a logarithmic relationship.

Whenever a pulse arrives which exceeds the quiescent level of O, the current flowing through diodes 25 and 24 will be transferred to diodes 21 and 23; the forward current through diode 22 will be cut off and 22 will be exposed to a reverse voltage in the order of 0.5 volt which will initiate a reverse current of about 2.4 microamperes in this diode. Assuming again that due to temperature changes this reverse current will be altered by a 1 microampere, and in the event that replacement is necessary further alteration of 1 microampere may be expected, the total change in the contact potential of diode 21 at 100 microamperes forward current would still be only 1 millivolt.

The error due to the temperature coefficient of the contact potentials are eliminated within 0.1 mv./°C. by matching the diode pair 21, 24 with the pair 23, 25 with respect to their temperature coefficients.

The difficulty encountered in the compensation of the shunt capacities of the diodes by means of paraphased pulses is also removed because the main discriminator diode 23 is not subject to significant reverse voltage stress at all. Moreover, no compensation is necessary because in the quiescent state the sum of the dynamic forward resistances of 24 and 25 is about 640 ohms and $E_0$ is grounded by bypass capacitance $C_1$. A pulse which does not exceed the quiescent level of O will be, therefore, differentiated on the network formed by this resistance and the shunt capacity of diodes 21 and 23 connected in series and amounting to a maximum of 0.5 $\mu\mu f$. Assume that the incoming pulse in the highest channels is of the order of 100 volts and has a rise-time of 0.1 $\mu$sec.; on account of the differentiation the transmitted pulse-height in O will be only 0.32 volt. Considering further that the output capacity of O plus the input capacity of the following amplifier will be not less than 10 $\mu\mu f.$, the pulse will be further decreased by a factor 20.

Differences in the forward characteristic of 21 and 23 are eliminated within ±2 mv. by matching 21 with 24 and 23 with 25. Any rise in the quiescent level due to the lower contact potentials in 24 and 25 will be counterbalanced through similarly lower contact potentials in 21 and 23; thus maintaining constant the channel setting for constant trigger level.

Any differences in the values of the resistors 26 will have only little effect on the quiescent level of O and accordingly on the channel width. Assuming a reasonable tolerance of the resistors to be 5 percent, the differences in the adjacent discriminators can amount to 7 percent. Due to the stabilizing effect of diodes 24 and 25 the error involved in the channel width will be only 2 mv., or ±0.2% of the channel width of 1 volt.

The time-rise of the circuit is defined by the output capacitance plus the input capacitance of the following amplifier (10 $\mu\mu f.$) and the forward resistances of 21 and 23 (340+300 ohms). Accordingly the rise-time will be of the order of 0.007 miscrosecond.

The fall-time of over-loading pulses, i. e., for pulses which cut off completely the current in 24 and in 25 will be determined by the same capacitances of 10 $\mu\mu f.$ and the load resistance 26 (100 kilo-ohms); it will be in the order of 1 microsecond.

Summing up, it is found:

(1) That the uncertainties in the discrimination level due to changes in the ambient temperature, drifts and replacements will be less than 2.5 mv.

(2) Using the same discriminator without alterations in the lowest and highest channels, the channel setting will shift by less than 0.7 mv. (increased in the lower channels).

Fig. 2 and the details of the description refer to a discriminator fed by positive pulses, but obviously it can similarly be used without any alterations in case of negative pulses by simply reversing the diodes and the potentials. This circumstance is a further advantage of the present discriminator which cannot be found in discriminators using thermionic tubes.

Fig. 3 shows an arrangement recommended to procure smaller output pulses. In the heretofore described discriminator the smallest output pulse has a height of 250 mv. This might in some cases be too high and furthermore prevent the use of a high gain amplifier after the discriminator. In the circuit of Fig. 3 a third discriminator with similar stabilizing network to that shown in Fig. 1 is used, but the current flowing through diode 27 and the load resistor 30 is here reduced to the order of 5 microamperes. Such reduction in the necessary current is possible without violating the stability property of the unit due to the circumstance that the reverse voltage across diode 28 can be set at a low value such as 250 mv. and is constant within ±2 mv. Using high back-resistance diodes for 28 and 27, this will further decrease the reverse current to 0.25 microampere. In this manner the greatest fluctuation of the reverse current is reduced to 0.25 microampere, involving potential differences of only 1 mv. in the quiescent level of O. On account of the low potential difference between $E_0$ and O (about 50 mv.) the output pulse can be made as low as 40 mv. Such discriminators require only an amplifier with 5 percent gain stability in front of the univibrator.

Fig. 4 is the diagram of a circuit in which the pulse amplitude discriminator is simultaneously used as trigger discriminator and positive feedback is supplied through the $V_1$ and $V_2$. Both tubes have on account of their high cathode resistances such high feedback that the gain ($g$) of the amplifier is very low, about 2 to 5. Triggering occurs when the loop gain reaches 1. This will be reached if the forward resistance $r_3$ of the diode 23' decreases and those of 24' and 25' increase through the influence of the incoming pulse to a value where:

$$1+r_3/(r_4+r_5)=g$$

Since forward resistances are inversely proportional to the forward currents the above equation will be satisfied when the current flowing in the quiescent state through diode 24' and diode 25' is almost completely transferred to 23' and 21'. The gain of the amplifier which together with the characteristic of the diodes determines the trigger level is very effectively stabilized by the means of the high feedback. A separate feedback was chosen for each tube to render possible tube exchanges without matching. The tubes $V_1$ and $V_2$ (404A) should have high transconductances and low input and output capacitances to insure a rise-time less than 0.007 microsecond.

Due to the fact that the discriminator unit can be used without needing any alterations in the highest and lowest channels, and that the transfer of the unit from one channel to another does not require a recalibration of the instrument and furthermore that the whole discriminator can be assembled out of ready made parts and no calibration of the channel settings is necessary, not even after the first assembly, mass production of such discriminator units now becomes possible.

A technical mass production feature of advantage would be to mount the five diodes and the resistor in a metal tube-shell with octal base and use it as a plug-in discriminator unit. The circuit of Fig. 4 can be mounted completely in plug-in turrets consisting of a shield can, tube sockets, terminal posts and octal plug.

It will be apparent that the embodiments shown are only exemplary and that various modifications can be made in construction and arrangement within the scope of my invention as defined in the appended claims.

I claim:

1. An electric pulse height discriminator comprising a pulse input signal terminal, a source of reference voltage, a main crystal discriminator diode back-biased by the reference voltage and arranged to conduct in the forward direction with respect to a pulse input signal at said terminal of amplitude greater than the reference voltage to produce an output signal, and means for reducing the back-current through said crystal diode in the quiescent or non-signal state of the discriminator comprising an auxiliary discriminator element connected to said main discriminator diode and biased to normally carry the main part of the back-voltage across said main diode in the quiescent state and a further discriminator diode back-biased by a further reference voltage supplied through a further load crystal diode; the further reference voltage being such that the maximum output of the further discriminator is reduced to a predetermined level.

2. The invention according to claim 1, said auxiliary discriminator element being a crystal diode.

3. The invention according to claim 2, said auxiliary discriminator element having a load resistance between it and said auxiliary biasing means, said load resistance comprising a further crystal diode.

4. The invention according to claim 3, including a main load resistance for said main discriminator diode supplied by said reference voltage, said main load resistance including crystal diode means.

5. The invention according to claim 4, said last crystal means being biased for forward conduction in the quiescent state.

6. The invention according to claim 5, said last crystal diode means comprising two diode elements connected in series, one of said diode elements being matched with respect to contact-potential in a forward direction with the crystal diode of the main discriminator and the other element being similarly matched with the crystal diode of the auxiliary discriminator at a current intensity equal to the forward current flowing through the load resistance diode in the quiescent state.

7. The invention according to claim 6, said matched pairs of diodes being further matched by pairs with each other with respect to their temperature coefficient in the forward direction, and being located in the circuit in such a sequence that the temperature coefficients of the main and auxiliary diodes together are equal to the temperature coefficients of the two load resistance diodes together.

8. The invention according to claim 1, including a number of similar discriminators for different reference voltage levels constituting a voltage amplitude channelizer, and means for supplying said different reference voltage levels, said last means comprising a potential divider chain of precision resistors fed by a regulated current source.

9. The invention according to claim 8, the biasing means for the auxiliary discriminator elements of the respective discriminators comprising a second potential divider chain fed by a constant current source.

10. The invention according to claim 1 and a further discriminator connected to the output of the first discriminator, said further discriminator comprising a further discriminator diode back-biased by a further reference voltage supplied through a further load crystal diode, the further reference voltage being such that the maximum output of the further discriminator is reduced to a predetermined level.

11. The invention according to claim 1, including a univibrator trigger circuit comprising vacuum tube having a grid capacitively coupled to the output of said main discriminator diode and a plate capacitively coupled to the grid of a second vacuum tube normally biased to conduct, the plate of said second tube being capacitively coupled between said main and auxiliary diode discriminators, each tube having sufficiently high negative feedback independent of the other tube to effectively stabilize the gain.

12. An electric pulse height discriminator comprising a first source of reference potential, a voltage dropping resistor, first diode means connected between a source of reference potential and said resistor in the forward conducting direction, a second source of potential lower than said first source by a definite substantial amount, and connected to a different point of said resistor from said first source, a pulse input signal terminal, auxiliary and main diode discriminator means respectively connected in series between said pulse input signal terminal and the junction of said first diode means and said resistor and oriented for forward conduction in response to an incoming signal pulse, guard diode means connected to a point between the junction of said auxiliary and main diode discriminator means and oriented oppositely to said auxiliary diode means and a third source of potential connected to said point through said guard diode means, said third source, differing slightly in voltage level from said reference source in a direction to provide only reverse current flow in the quiescent and non-signal state through said auxiliary diode means.

13. An electric pulse-height discriminator comprising a source of reference potential, a source of second potential lower by a predetermined amount than said reference potential, a first diode and second diode and a dropping resistor connected respectively in series between said two sources, said diodes being oriented for normally forward current flow, an input pulse terminal, third and fourth diodes respectively connected in series between said terminal and the junction of said second diode and said resistor, a third voltage source of slightly lower potential than said reference potential, and a fifth diode connected between said third voltage source and the junction of said third and fourth diodes.

14. The invention according to claim 13, including a series of additional similar pulse-height discriminators, the reference potential for each discriminator in the series being progressively different in value, and a common pulse input source connected to all of the respective input pulse terminals of the system, whereby each discriminator defines a pulse-amplitude channel.

References Cited in the file of this patent
UNITED STATES PATENTS

| | | |
|---|---|---|
| 2,557,729 | Eckert | June 19, 1951 |
| 2,612,550 | Jacobi | Sept. 30, 1952 |
| 2,618,753 | Van Mierlo | Nov. 18, 1952 |
| 2,657,318 | Rack | Oct. 27, 1953 |
| 2,715,181 | Glenn | Aug. 9, 1955 |

OTHER REFERENCES

Pro. I. R. E., May 1950, pp. 511–514.